US012764493B2

(12) United States Patent
Ishizaki

(10) Patent No.: US 12,764,493 B2
(45) Date of Patent: Oct. 13, 2026

(54) INFORMATION PROCESSING DEVICE, INFORMATION PROCESSING METHOD, AND INFORMATION PROCESSING PROGRAM

(71) Applicant: PIONEER CORPORATION, Tokyo (JP)

(72) Inventor: Yuya Ishizaki, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 162 days.

(21) Appl. No.: 18/689,043

(22) PCT Filed: Jan. 31, 2022

(86) PCT No.: PCT/JP2022/003655
§ 371 (c)(1),
(2) Date: Mar. 4, 2024

(87) PCT Pub. No.: WO2023/145088
PCT Pub. Date: Aug. 3, 2023

(65) Prior Publication Data

US 2024/0388869 A1 Nov. 21, 2024

(51) Int. Cl.
*H04W 4/021* (2018.01)
*G01C 21/34* (2006.01)
*G06Q 30/0251* (2023.01)

(52) U.S. Cl.
CPC ............ *H04W 4/021* (2013.01); *G01C 21/34* (2013.01); *G06Q 30/0261* (2013.01)

(58) Field of Classification Search
CPC ... H04W 4/021; G01C 21/34; G01C 21/3685; G01C 21/3641; G06Q 30/0261; G06Q 10/06
See application file for complete search history.

(56) References Cited

U.S. PATENT DOCUMENTS

| | | | |
|---|---|---|---|
| 2013/0282717 | A1 | 10/2013 | Kameyama |
| 2013/0282738 | A1 | 10/2013 | Kameyama |
| 2016/0033290 | A1 | 2/2016 | Inoue |

(Continued)

FOREIGN PATENT DOCUMENTS

| | | | |
|---|---|---|---|
| JP | 2007-264764 | A | 10/2007 |
| JP | 2012-053593 | A | 3/2012 |
| JP | 2016-076084 | A | 5/2016 |

(Continued)

OTHER PUBLICATIONS

Extended European Search Report for Application No. 22923951.2 mailing date Sep. 30, 2025, 9 pages.

*Primary Examiner* — Farid Seyedvosoghi
(74) *Attorney, Agent, or Firm* — Foley & Lardner LLP

(57) ABSTRACT

An information processing device according to the present application includes an acquisition unit that acquires history information on a parking location where a user parked a vehicle; a calculation unit that calculates a regional prosperity level that is a prosperity level in a first extraction region extracted according to a distribution state of the parking location, based on a predetermined parameter in the first extraction region; and an identification unit that identifies a second extraction region that is a sphere of life of the user, based on the first extraction region and the regional prosperity level.

14 Claims, 7 Drawing Sheets

(56) References Cited

U.S. PATENT DOCUMENTS

| | | | | |
|---|---|---|---|---|
| 2016/0092469 | A1* | 3/2016 | Mukherjee | H04L 67/306 705/325 |
| 2019/0075426 | A1* | 3/2019 | Nomura | G06Q 30/0269 |

FOREIGN PATENT DOCUMENTS

| | | | | |
|---|---|---|---|---|
| JP | 2017157036 | A | * | 9/2017 |
| JP | 2021-148476 | A | | 9/2021 |
| WO | WO-2018/173607 | A1 | | 9/2018 |

* cited by examiner

INFORMATION PROCESSING DEVICE, INFORMATION PROCESSING METHOD, AND INFORMATION PROCESSING PROGRAM

CROSS-REFERENCE TO RELATED APPLICATION

This application is a national stage of International Application No. PCT/JP2022/003655, filed on Jan. 31, 2022, which designates the United States, the entire contents of which are herein incorporated by reference.

FIELD

The present invention relates to an information processing device, an information processing method, and an information processing program.

BACKGROUND

Conventionally, technologies for identifying the sphere of life of the user, and selecting the content according to the habits of the user in the identified sphere of life have been developed.

CITATION LIST

Patent Literature

Patent Literature 1: Japanese Patent Application Laid-open No. 2007-264764

SUMMARY

Technical Problem

For example, in the conventional technology described above, by statistically calculating the daily activity range of the user from the moving history of the user, the activity range is identified as the sphere of life.

However, in reality, the activity range of the user tends to depend on the regional characteristics of the surrounding area (for example, the activity range tends to be narrowed in the urban areas where sufficient services are provided, and the activity range tends to be increased in the rural areas where services tend to be insufficient). Hence, in the conventional technology described above in which the moving history is simply used, there is room for improvement in terms of accurately identifying the sphere of life of the user.

The present invention has been made in view of the above, and an object of the present invention is to provide an information processing device, an information processing method, and an information processing program that can accurately identify the sphere of life of the user, for example.

Solution to Problem

An information processing device according to claim 1 includes: an acquisition unit that acquires history information on a parking location where a user parked a vehicle; a calculation unit that calculates a regional prosperity level that is a prosperity level in a first extraction region extracted according to a distribution state of the parking location, based on a predetermined parameter in the first extraction region; and an identification unit that identifies a second extraction region that is a sphere of life of the user, based on the first extraction region and the regional prosperity level.

The information processing method according to claim 12 is performed by an information processing device, wherein the information processing method includes: a step of acquiring history information on a parking location where a user parked a vehicle; a step of calculating a regional prosperity level that is a prosperity level in a first extraction region extracted according to a distribution state of the parking location, based on a predetermined parameter in the first extraction region; and a step of identifying a second extraction region that is a sphere of life of the user, based on the first extraction region and the regional prosperity level.

The information processing program according to claim 13 is excuted by an information processing device to execute a procedure, the procedure comprising: acquiring history information on a parking location where a user parked a vehicle; calculating a regional prosperity level that is a prosperity level in a first extraction region extracted according to a distribution state of the parking location, based on a predetermined parameter in the first extraction region; and identifying a second extraction region that is a sphere of life of the user, based on the first extraction region and the regional prosperity level.

DESCRIPTION OF EMBODIMENTS

Figure 1:
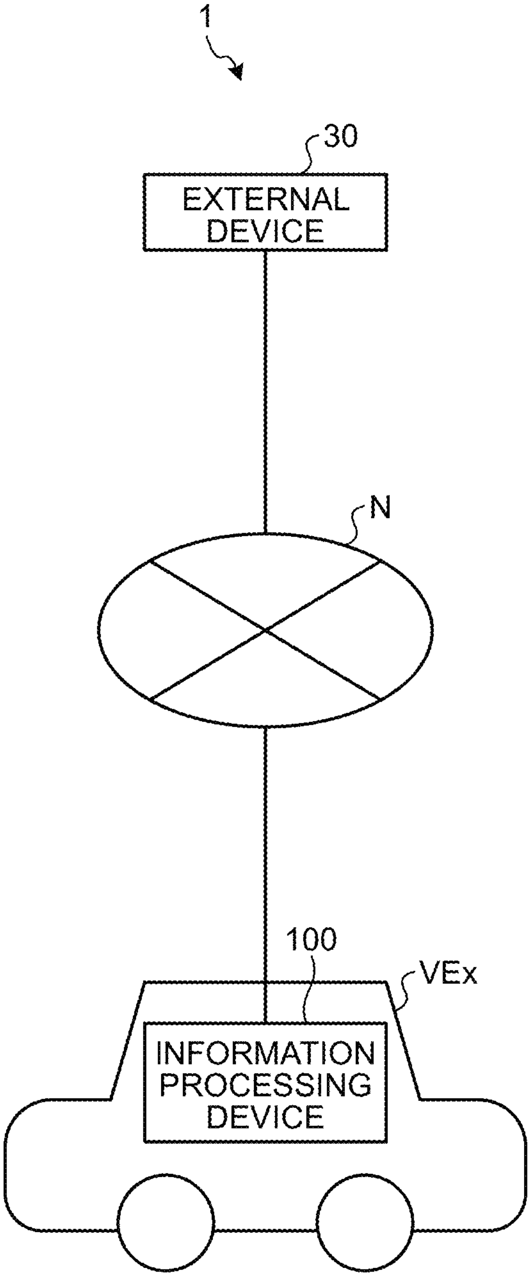
FIG. 1 is a diagram illustrating an example of an information processing system according to an embodiment.

Hereinafter, an example of a mode (hereinafter, referred to as an "embodiment") for carrying out an information processing device, an information processing method, and an information processing program will be described in detail with reference to the accompanying drawings. However, the information processing device, the information processing method, and the information processing program are not limited to the embodiment. Moreover, in the following embodiment, the same reference numerals are given to the same components, and repeated descriptions are omitted.

EMBODIMENT

1. Introduction

For example, users who are living in urban areas often have a variety of good services (for example, purchase, traffic, public, welfare, entertainment, and the like) in the surrounding area. Hence, from the viewpoint that daily needs can be accommodated for in the neighborhood, the daily activity range of the users tends to be relatively narrow. On the other hand, compared to the urban areas, services tend to be poor in rural areas. Hence, the daily activity range of users who are living in rural areas tends to increase than that of the users who are living in urban areas.

The present invention has been made by paying attention to the point that the sphere of life of the user can be identified in a more accurate manner, by applying the fact that the activity range of the user tends to depend on the service fulfillment level in the surrounding area, that is, the prosperity level of the region (hereinafter, may be referred to as "regional prosperity level").

In this example, the sphere of life refers to a range where a user travels on a daily basis, and can be obtained from history information such as how frequently the user has been to a certain place. However, it is not always possible to identify the sphere of life of the user in a highly accurate manner, by just using such history information as in the conventional technology described above. Therefore, in the present invention, a logic for determining the sphere of life of the user is developed, on the basis of the arrival history of the user, and the regional prosperity level in the region where the user is frequently located (for example, an area where the home or workplace of the user is located).

In the following, a specific example of a sphere of life identification logic corresponding to the present invention will be described in detail. With the sphere of life identification logic according to the embodiment, it is possible to further optimize the services (for example, advertisement, road guidance, risk notification, search results, and the like) provided to the users. A specific example of such service optimization logic will also be described in detail below.

2. System Configuration

First, with reference to FIG. 1, a configuration of an information processing system according to the embodiment will be described. FIG. 1 is a diagram illustrating an example of an information processing system according to the embodiment. As an example of the information processing system according to the embodiment, FIG. 1 illustrates an information processing system 1. The information processing (sphere of life identification logic and service optimization logic) according to the embodiment may be implemented by the information processing system 1.

As illustrated in FIG. 1, the information processing system 1 may include an external device 30 and an information processing device 100. Moreover, the external device 30 and the information processing device 100 are communicatively connected by wire or wirelessly via a network N. Furthermore, the information processing system 1 illustrated in FIG. 1 may include any number of the external devices 30 and any number of the information processing devices 100.

The information processing device 100 is a device that performs information processing according to the embodiment. Specifically, the information processing device 100 acquires history information on parking locations where a user parked a vehicle, and calculates the regional prosperity level in a first extraction region extracted according to the distribution state of the parking locations indicated by the history information, on the basis of a predetermined parameter in the first extraction region. Then, the information processing device 100 identifies a second extraction region that is the sphere of life of the user, on the basis of the first extraction region and the regional prosperity level.

As illustrated in FIG. 1, the information processing device 100 may be mounted on a vehicle VEx. That is, the information processing device 100 may be an in-vehicle device. For example, the information processing device 100 may be a dedicated navigation device that is built into or loaded onto the vehicle VEx.

For example, the information processing device 100 may include a navigation device and a video recording device. As an example, the information processing device 100 may be a composite device in which a navigation device and a video recording device that are independent from each other, are communicatively connected. As another example, the information processing device 100 may be a single device having a navigation function and a video recording function.

Moreover, the information processing device 100 may include various sensors. For example, the information processing device 100 may include various sensors such as a camera, accelerometer, gyro sensor, GPS sensor, and barometric pressure sensor. Thus, the information processing device 100 may also have functions to interact with and provide information to the user to support the user to drive, on the basis of sensor information acquired by various sensors.

The information processing device 100 can also use sensor information detected by a sensor provided in the vehicle VEx itself as a safety driving system, in addition to the sensors provided in an in-vehicle device 10.

Moreover, by installing a predetermined application in a portable terminal device (for example, a smartphone, tablet terminal, notebook PC, desktop PC, PDA, or the like) used by the user on a daily basis, the user can operate the portable terminal device the same way as the information processing device 100. That is, the user can use his/her own portable terminal device as the in-vehicle device. Thus, the portable terminal device owned by the user can also be used as the information processing device 100 according to the embodiment.

Moreover, in the present embodiment, a user is defined as a person that may include concepts such as a driver of the vehicle VEx or an owner of the vehicle VEx.

Subsequently, the external device 30 may be any device as long as the device can implement information processing according to the embodiment, in cooperation with the information processing device 100. For example, the external device 30 may be a content providing device that provides candidates for content (for example, advertising content, tourist information, or the like) according to the travel of the vehicle VEx, or may be a map information providing device that provides electronic maps. As another example, the external device 30 may also be a device that provides timetable information relating to transport services such as trains and buses, or a device that provides weather reports.

In this example, if the information processing device 100 is an edge computer that performs edge processing near the user, for example, the external device 30 may be a cloud computer that performs processing on the cloud side. That is, the external device 30 may also be a server device.

In the following embodiment, the information processing device 100 serving as an in-vehicle device performs information processing according to the embodiment. However, the external device 30 on the cloud side may also perform information processing according to the embodiment. In this case, the external device 30 may have some or all of the functions of the information processing device 100. Moreover, when the external device 30 performs information processing according to the embodiment, a configuration may be adopted in which the information processing device 100 obtains the processing results of the external device 30, and provides various services on the basis of the obtained processing results.

3. Overview of Information Processing

Figure 2:
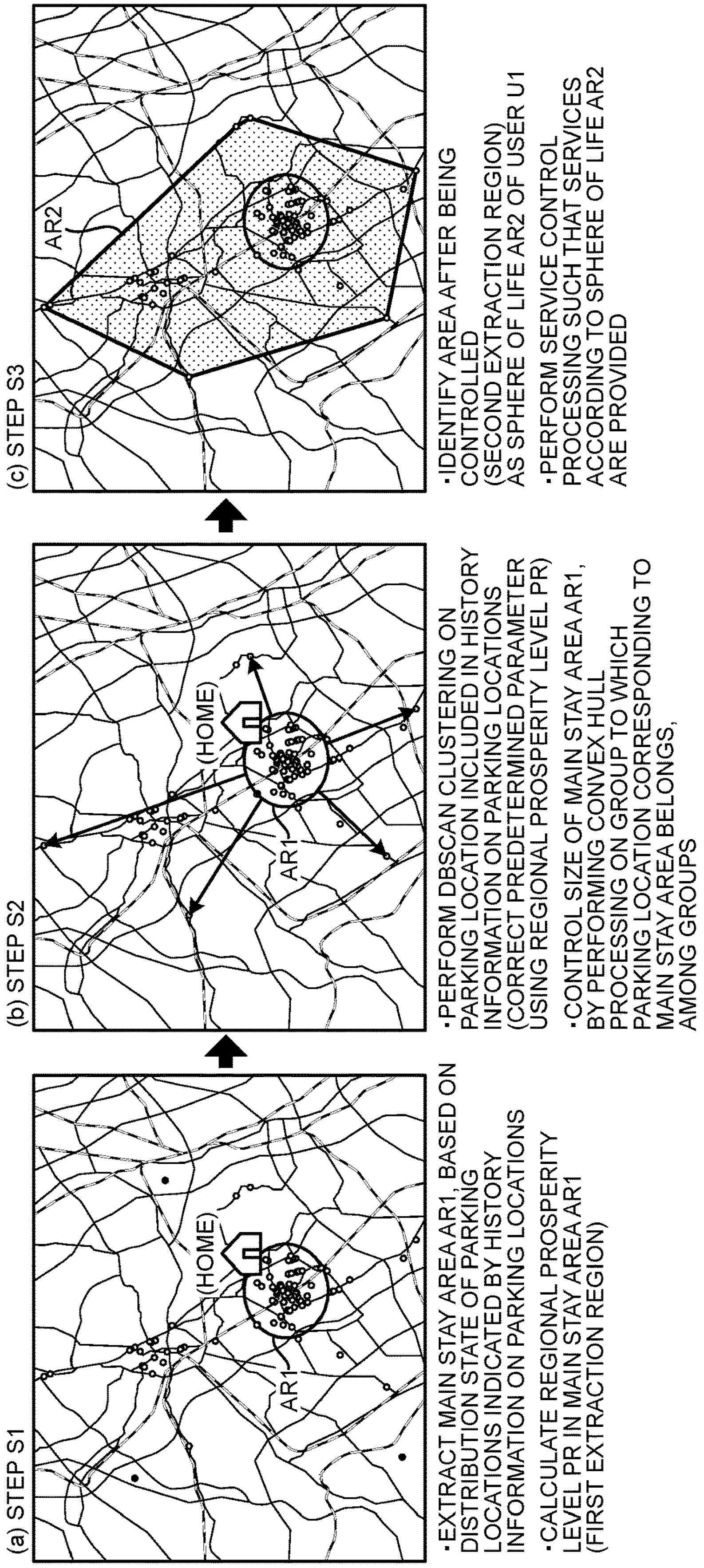
FIG. 2 is an explanatory diagram for explaining an overview of information processing according to the embodiment.

In the following, with reference to FIG. 2, an overview of information processing according to the embodiment will be described. FIG. 2 is an explanatory diagram for explaining an overview of information processing according to the embodiment. Specifically, FIG. 2 focuses on the sphere of life identification logic, and the processing procedure will be described.

Moreover, in the example in FIG. 2, the sphere of life of a user U1, who is an example of a user, is identified on the basis of history information on parking locations where the user U1 parked a vehicle VE1 (an example of the vehicle VEx), under an assumption that the user U1 is using a content providing service (hereinafter, referred to as a "service SA") corresponding to the information processing according to the embodiment.

Moreover, FIG. 2 illustrates a scene in which the sphere of life of the user U1 is identified from FIG. 2(*a*) to FIG. 2(*c*), as the sphere of life identification logic progresses.

In FIG. 2, to identify the sphere of life, the sphere of life identification logic is executed at a specific timing when sufficient history information is accumulated (for example, when one week has passed since the user U1 started using the service SA).

First, step S1 in FIG. 2(*a*) will be described. The information processing device 100 extracts a main stay area AR1 that is the main area where the user U1 mainly spends time in daily life, on the basis of the distribution state of parking locations indicated by the history information on parking locations. For example, the information processing device 100 may extract an area with the highest density distribution of parking locations, among the areas obtained by dividing the map information in which the parking locations are illustrated, as the main stay area AR1. For example, the main stay area AR1 may be considered as a home area where the home of the user U1 is located, and is an area corresponding to the first extraction region.

For example, the information processing device 100 may also extract a plurality of the main stay areas AR1. In this case, an area with the highest density distribution of parking locations may be considered as a home area, and an area with the next highest density distribution may be considered as a workplace area.

Next, the information processing device 100 calculates a regional prosperity level PR in the main stay area AR1. For example, the information processing device 100 may calculate the regional prosperity level PR in the main stay area AR1, on the basis of the number of predetermined facilities (for example, stores, public facilities, tourist facilities, medical institutions, landmarks, and the like) in the main stay area AR1. As an example, the information processing device 100 may calculate the regional prosperity level PR in the main stay area AR1, on the basis of the number of facilities per unit area in the main stay area AR1. For example, the information processing device 100 may calculate the regional prosperity level PR with a higher value, to indicate that the main stay area AR1 is more prosperous (plenty of good services) when there are greater number of facilities per unit area.

Subsequently, step S2 in FIG. 2(*b*) will be described. The information processing device 100 performs a predetermined clustering algorithm on the parking location included in the history information on parking locations. In the present embodiment, it is assumed that the information processing device 100 performs DBSCAN clustering on the parking location included in the history information on parking locations.

For example, the information processing device 100 can perform clustering under the setting condition in which the group can grow (cluster is generated), if there are "N2" or more parking locations within a radius of "N1 km". Such a setting condition may be set in advance for the information processing device 100, or the information processing device 100 may dynamically change the setting condition as appropriate, according to the distribution state of parking locations.

Moreover, in DBSCAN, "min_distance" is used as a parameter to adjust whether the group can be grown as the same group, according to the distance between the parking location and the parking location. However, the information processing device 100 corrects the "min_distance" with the regional prosperity level PR. For example, the information processing device 100 corrects the "min_distance", by multiplying the "min_distance" using the regional prosperity level PR as a weight value. The information processing device 100 then performs DBSCAN clustering using the corrected "min_distance".

Moreover, as described above, in DBSCAN, a group is generated as a result of determining whether the group belong to the same group. Therefore, the information processing device 100 controls the size of the main stay area AR1, by performing convex hull processing on the group to which the parking location corresponding to the main stay area AR1 belongs, among the generated groups. FIG. 2(*b*) is an example in which the main stay area AR1 is corrected (processed) to increase the size (area and shape) of the main stay area AR1, as a result of DBSCAN clustering and convex hull processing.

Subsequently, step S3 in FIG. 2(*c*) will be described. The information processing device 100 identifies the second extraction region that is a polygon area after the main stay area AR1 (first extraction region) is controlled at step S2, as a sphere of life AR2 of the user U1.

When the sphere of life AR2 is identified in this manner, the information processing device 100 performs service control processing such that services according to the sphere of life AR2 are provided to the user U1.

The overview of information processing according to the embodiment has been described with reference to FIG. 2. For example, in a case when history information on parking locations is insufficient (for example, the initial state when the user U1 has just started using the service SA), the information processing device 100 may substantially identify the main stay area AR1 as the sphere of life AR2 (main stay area AR1=sphere of life AR2). For example, the information processing device 100 may extract a circular region with a specific radius as the main stay area AR1, on the basis of the distribution density.

However, the information processing device 100 may repeat the sphere of life identification logic with the lapse of time, and when the history information is accumulated during the time, as illustrated in FIG. 2(*b*), it will be possible to appropriately control the size of the main stay area AR1. As a result, as illustrated in FIG. 2(*c*), the information processing device 100 can identify the sphere of life AR2 of an optimal size (main stay area AR1<sphere of life AR2).

When the history information is further accumulated with the lapse of time, the information processing device 100 may reduce the size of the sphere of life AR2 than that of the example in FIG. 2(*c*) or may further increase the size.

Moreover, in generating a group (cluster), the DBSCAN clustering illustrated in FIG. 2 corresponds to a process of removing the parking location corresponding to a location that is estimated not to be in the sphere of life of the user U1 (for example, a location significantly far away from the main stay area AR1) as noise while identifying the sphere of life. For example, in FIG. 2(*a*), parking locations serving as such noise are illustrated by (three) black dots. In FIG. 2(*b*), an example in which the parking locations serving as noise are removed as a result of DBSCAN clustering. Moreover, by removing the parking locations serving as noise, as illustrated in FIG. 2(*c*), the information processing device 100 can identify the sphere of life AR2 of the size closer to the sphere of life rightfully considered by the user U1.

4. Service Control According to Sphere of Life

Figure 3:
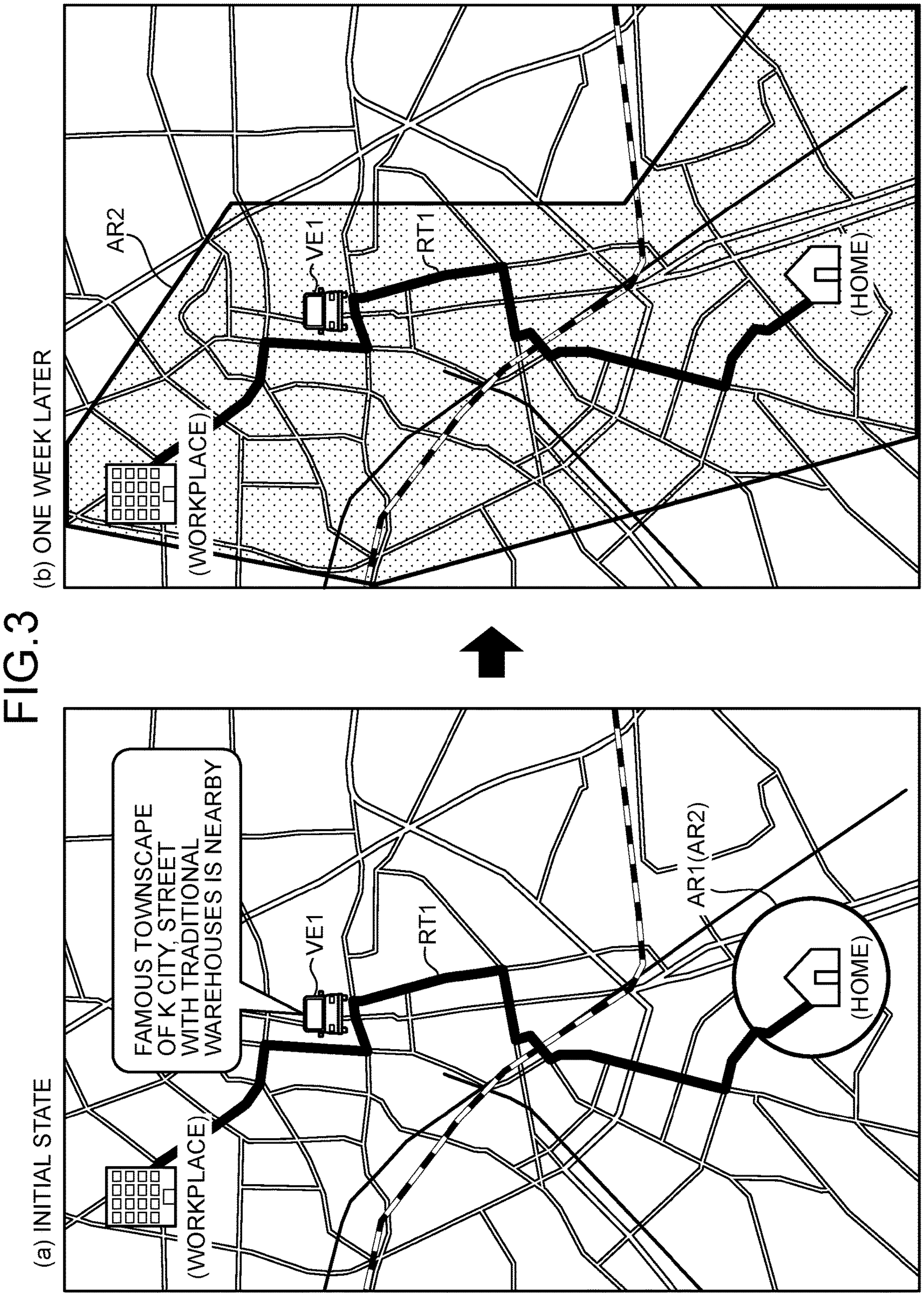
FIG. 3 is a diagram illustrating an example of service optimization logic according to the embodiment.

In the following, with reference to FIG. 3, an example of service optimization logic in which the information processing device 100 controls the services that should be provided to the user U1 according to the sphere of life AR2 will be described. FIG. 3 is a diagram illustrating an example of service optimization logic according to the embodiment. By using the initial state when the user U1 has just started using the service SA as a comparative example, FIG. 3 illustrates an example of optimization logic indicating how the content provided to the user U1 is optimized, as a result of appropriately identifying the sphere of life AR2 with the lapse of time.

First, FIG. 3(*a*) will be described. FIG. 3(*a*) illustrates an example of providing content in the initial state when the user U1 has just started using the service SA. As illustrated in FIG. 3(*a*), in the initial state, the information processing device 100 only extracts the circular area around the home of the user U1 as the main stay area AR1. At this point, such a main stay area AR1 is considered as the sphere of life AR2 of the user U1. As illustrated in FIG. 3(*a*), the sphere of life AR2 in such a state does not include a travel route RT1 that connects the home of the user U1 to the workplace. That is, in the example in FIG. 3(*a*), the information processing device 100 does not recognize the travel route RT1 as the daily travel range of the user U1. In other words, the information processing device 100 fails to recognize the travel route RT1 that should be the rightful sphere of life of the user U1, as the sphere of life.

In such a case, as illustrated in FIG. 3(*a*), the information processing device 100 may provide information that the user U1 who is using the travel route RT1 as the sphere of life should already know, as the content of tourist information. For example, as illustrated in FIG. 3(*a*), when the user U1 is traveling along the travel route RT1 and approaches K city, the information processing device 100 may provide the content of tourist information such as "Famous townscape of K city, a street with traditional warehouses is nearby". However, it is apparent that the user U1 already knows such information, and the information is useless for the user U1. Then, for example, if such content of tourist information is presented every time the user U1 commutes to work, the user U1 may be annoyed.

However, as has been described above, the information processing device 100 can more appropriately identify the sphere of life AR2, when the history information is accumulated with the lapse of time. For example, when one week has passed since the user U1 started using the service SA, as illustrated in FIG. 3(*b*), the information processing device 100 can expand the main stay area AR1 to the size including the travel route RT1. Hence, the information processing device 100 can identify the sphere of life AR2 with a size closer to the sphere of life rightfully considered by the user U1.

Moreover, in the example in FIG. 3(*b*), the information processing device 100 can figure out that the content of tourist information provided in the initial state is useless information for the user U1. Consequently, as illustrated in FIG. 3(*b*), the information processing device 100 controls such that the content of tourist information is not provided, even if the user U1 is driving the travel route RT1 and approaches K city. Furthermore, as a result, the information processing device 100 can optimize the provision of content such that the user U1 will not be annoyed by the content provision.

5. Configuration of Information Processing Device

Figure 4:
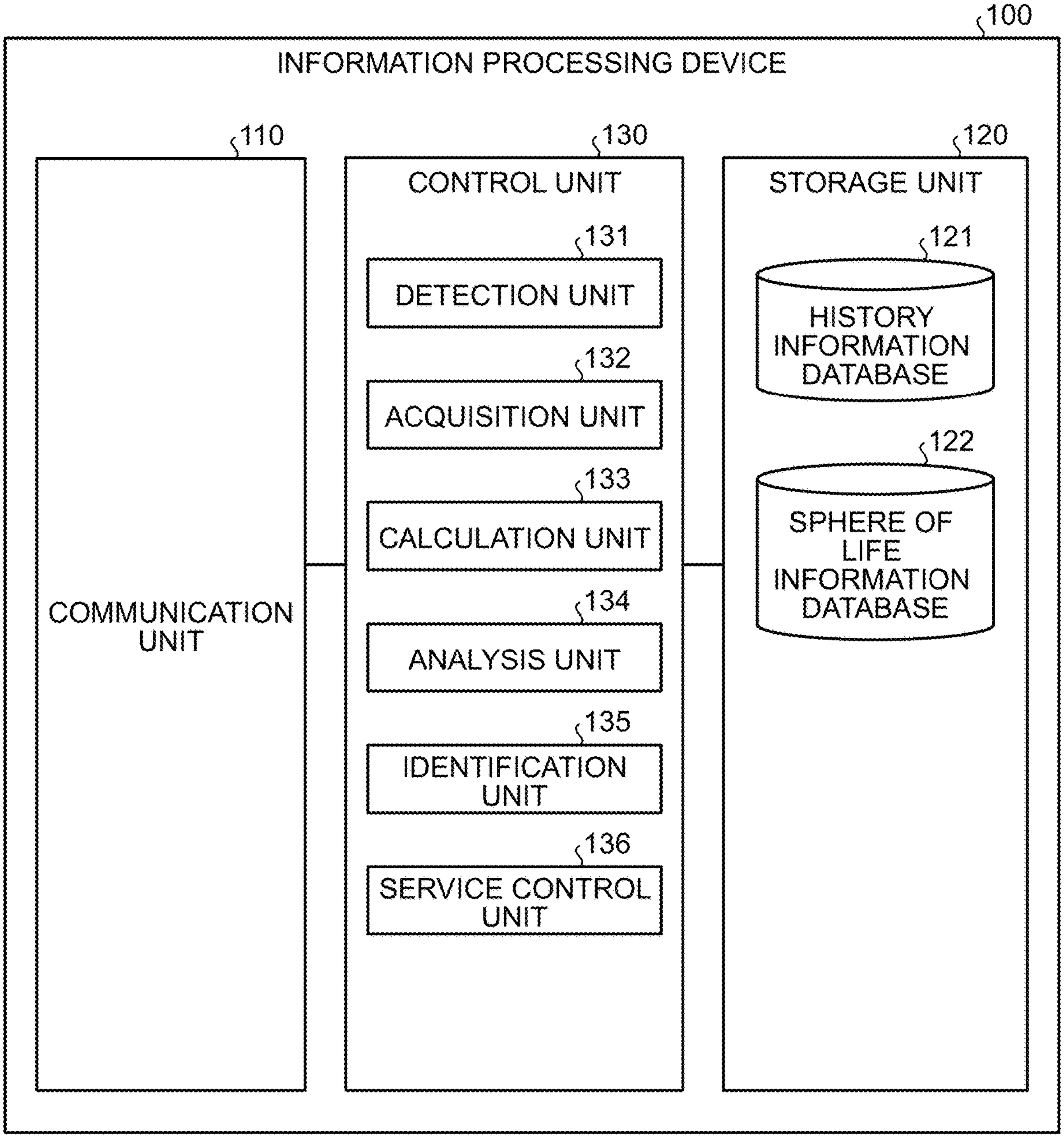
FIG. 4 is a diagram illustrating a configuration example of an information processing device according to the embodiment.

In the following, with reference to FIG. 4, the information processing device 100 according to the embodiment will be described. FIG. 4 is a diagram illustrating a configuration example of the information processing device 100 according to the embodiment. As illustrated in FIG. 4, the information processing device 100 includes a communication unit 110, a storage unit 120, and a control unit 130.

About Communication Unit 110

For example, the communication unit 110 is implemented by a Network Interface Card (NIC) and the like. Then, the communication unit 110 is connected to the network N by wire or wirelessly, and transmits and receives information to and from the in-vehicle device 10, for example.

About Storage Unit 120

For example, the storage unit 120 is implemented by a semiconductor memory element such as a Random Access Memory (RAM) and a flash memory, or a storage device such as a hard disk and an optical disc. The storage unit 120 may include a history information database 121 and a sphere of life information database 122.

About History Information Database 121

The history information database 121 stores history information on parking locations where the user parked the vehicle VEx. For example, the history information database 121 may store a set of parking location where the user parked the vehicle VEx and parking time at which the user parked the vehicle VEx, as one record, in association with history ID. The information processing device 100 may also include a GPS receiver, and the parking location may be defined by longitude and latitude information derived from GPS.

About Sphere of Life Information Database 122

The sphere of life information database 122 stores information indicating the sphere of life identified by the sphere of life identification logic. For example, the sphere of life information database 122 may store a set of date and time when the sphere of life identification logic is executed and information indicating the sphere of life AR2 identified at the date and time, as one record, in association with sphere of life ID.

About Control Unit 130

The control unit 130 is implemented by a Central Processing Unit (CPU), Micro Processing Unit (MPU), or the like executing various computer programs (for example, information processing programs according to the embodiment) stored in the storage device inside the information processing device 100, while using the RAM as a work area. Moreover, for example, the control unit 130 is implemented by an integrated circuit such as an Application Specific Integrated Circuit (ASIC) or a Field Programmable Gate Array (FPGA).

As illustrated in FIG. 4, the control unit 130 includes a detection unit 131, an acquisition unit 132, a calculation unit 133, an analysis unit 134, an identification unit 135, and a service control unit 136, and implements or executes the functions and actions of information processing described below. The internal configuration of the control unit 130 is not limited to the configuration illustrated in FIG. 4, and may be another configuration as long as information processing to be described below is performed. Moreover, the connection relation between the processing units of the control unit 130 is not limited to the connection relation illustrated in FIG. 4, and may be another connection relation.

About Detection Unit 131

The detection unit 131 determines whether the user parked the vehicle VEx, and if it is determined that the user parked the vehicle VEx, detects the parking location where the user parked the vehicle VEx. For example, if the vehicle VEx is stopped, the detection unit 131 measures the vehicle stopping time, and if it is recognized that the vehicle is stopped for a predetermined period or more, the detection unit 131 may determine that the user parked the vehicle VEx. Moreover, in this case, the detection unit 131 may detect the location where the vehicle VEx is parked, as the parking location.

Furthermore, the detection unit 131 registers a set of location information indicating the parking location and time when the vehicle VEx is parked in the history information database 121, as the history information on parking locations. For example, the detection unit 131 may register a set of location information indicating the parking location and time when the vehicle VEx is parked in the history information database 121, in association with history ID.

About Acquisition Unit 132

The acquisition unit 132 acquires the history information on parking locations where the user parked the vehicle VEx. For example, the acquisition unit 132 may acquire history information from the history information database 121, upon determining that it is time to perform the sphere of life determination logic.

About Calculation Unit 133

The calculation unit 133 calculates the regional prosperity level that is the prosperity level in a certain region. For example, the calculation unit 133 obtains the distribution state of parking locations, on the basis of the history information on parking locations. Then, on the basis of the obtained distribution state, the calculation unit 133 extracts the main stay area AR1 that is the main area where the user of the vehicle VEx mainly spends time in daily life. For example, the calculation unit 133 may extract an area with the highest density distribution of parking locations, among the areas obtained by dividing the map information indicating the distribution state, as the main stay area AR1.

In such a situation, the calculation unit 133 calculates the regional prosperity level PR in the main stay area AR1 (first extraction region), on the basis of a predetermined parameter in the main stay area AR1. For example, the calculation unit 133 may calculate a predetermined parameter per unit area in the main stay area AR1, as the regional prosperity level PR.

The predetermined parameter in this example refers to one of the number of predetermined facilities (for example, stores, public facilities, tourist facilities, medical institutions, landmarks, and the like) in the main stay area AR1, the number of public transport services (for example, stations, bus stops, and the like) in the main stay area AR1, or feature information indicating the geographic features of the main stay area AR1.

As a predetermined parameter, the calculation unit 133 may also calculate the regional prosperity level PR using the number of predetermined facilities in the main stay area AR1, or the number of public transport services in the main stay area AR1, and correct the calculated regional prosperity level PR with the feature information.

About Analysis Unit 134

The analysis unit 134 performs clustering on the parking locations indicated by the history information on parking locations, on the basis of the regional prosperity level PR. For example, the analysis unit 134 may perform predetermined clustering algorithm on the parking locations included in the history information on parking locations. For example, the analysis unit 134 may perform DBSCAN clustering. More specifically, the analysis unit 134 may perform DBSCAN clustering under the setting condition in which the group will grow if there are "N2" or more parking locations within the radius of "N1 km".

Moreover, in DBSCAN clustering, the analysis unit 134 uses "min_distance" as a parameter to adjust whether the group is grown as the same group, according to the distance between the parking location and the parking location. However, the information processing device 100 may also perform clustering again, by correcting the "min_distance" with the regional prosperity level PR, and using the corrected "min_distance".

About Identification Unit 135

The identification unit 135 identifies the second extraction region that is the sphere of life of the user, on the basis of the main stay area AR1 (first extraction region) and the regional prosperity level PR. For example, the identification unit 135 performs convex hull processing on the group to which the parking location included in the main stay area AR1 belongs, among the groups of parking locations generated as a result of clustering by the analysis unit 134. Then, the identification unit 135 identifies the second extraction region that is a polygon area generated by convex hull processing, as the sphere of life AR2 of the user. Such processing corresponds to controlling the size of the main stay area AR1, bringing the size closer to the sphere of life rightfully considered by the user, and identifying the second extraction region that is an area brought closer to the rightful sphere of life, as the sphere of life AR2.

Moreover, the identification unit 135 may register information indicating the sphere of life AR2 in the sphere of life information database.

About Service Control Unit 136

The service control unit 136 controls the services that should be provided to the user of the vehicle VEx, according to the sphere of life AR2 (second extraction region) identified by the identification unit 135. For example, the service control unit 136 controls the services that should be provided to the user of the vehicle VEx by service optimization logic, on the basis of the sphere of life AR2 identified by the identification unit 135.

As described in FIG. 3, the service control unit 136 may control such that the content of tourist information corresponding to the sphere of life AR2 will not be provided to the user. On the other hand, the service control unit 136 may control such that advertising content relating to a predetermined facility (for example, a store) in the sphere of life AR2 is provided to the user. For example, by extracting the advertising content on the store in the sphere of life AR2 among the advertising contents obtained from the external device 30, the service control unit 136 may control such that the advertising content is output from the information processing device 100. The advertising content may be image information, and in this case, the image information may be output on a display screen of the information processing device 100. On the other hand, the advertising content may be audio information, and in this case, the audio information may be output from a speaker of the information processing device 100.

For example, in a state where the sphere of life of the user is not accurately identified, the advertising content of an area outside the daily activity range of the user may be provided. Such an advertising content may not be highly appealing to the user. On the other hand, with the service optimization logic according to the embodiment, the advertising content corresponding to the sphere of life AR2 the size of which is closer to the rightful sphere of life will be provided. Hence, it is possible to increase the appealing power of the advertising content.

Moreover, the service control unit 136 may control such that route guidance according to the destination point set by the user and the sphere of life AR2 is provided. For example, the service control unit 136 controls the route to the destination point provided as route guidance, according to whether the destination point set by the user is in the sphere of life AR2. As a more specific example, for example, if the departure point and the destination point of the user are both included in the sphere of life AR2, the service control unit 136 searches roads used daily by local residents in the sphere of life AR2, from the sphere of life AR2. Then, for example, among the routes from the departure point to the destination point, the service control unit 136 controls such that a route including the searched roads is provided as a shortcut route (or a detour route). The user who uses the sphere of life AR2 as the daily activity range can most likely travel such a shortcut route without getting lost. Hence, it is possible to save time. That is, the information processing device 100 can increase the variation of route selection in route guidance, by providing route guidance according to such possibilities.

On the other hand, for example, if the departure point and the destination point of the user are both not included in the sphere of life AR2, the service control unit 136 may not provide a shortcut route in accordance with the local residents in the sphere of life AR2, and may provide route guidance that consists of typical routes common to all the users.

In this example, it is assumed that a navigation system corresponding to the information processing device 100 includes a notification control system that notifies the presence of a predetermined danger area (for example, a construction site and the like) in advance. In such a case, the service control unit 136 may control such that notification is made according to whether a predetermined danger area is included in the sphere of life AR2. For example, the service control unit 136 detects whether a predetermined danger area is on the route the user is currently being guided and on the route within the sphere of life AR2. In this process, for example, even if a predetermined danger area is detected, the service control unit 136 may estimate that the user already knows the presence of the predetermined danger area, and control such that the presence of danger area will not be notified. As a result, the information processing device 100 can control such that information useless to the user will not be notified. Hence, it is possible to reduce the number of situations where the user is annoyed.

The service control unit 136 may also detect whether a predetermined danger area is on the route the user is currently being guided and on the route outside the sphere of life AR2. Then, for example, upon detecting a predetermined danger area, the service control unit 136 may estimate that the user does not know the presence of a predetermined danger area, and control such that the presence of danger area is notified.

Moreover, when a search request is made by the user, the service control unit 136 may control the search results corresponding to the search request, according to whether the location where the search request is made, is in the sphere of life AR2. For example, it is assumed that the user has requested to search a "pasta restaurant" by operating the information processing device 100, while traveling in the sphere of life AR2. In such a case, the service control unit 136 searches "pasta restaurants" in the sphere of life AR2. Then, for the searched "pasta restaurants", the service control unit 136 controls such that information in which the popularity of the "pasta restaurant" is given priority compared to the current location of the user is provided. For example, the service control unit 136 may control such that information on the more popular "pasta restaurant" is preferentially provided, among the searched "pasta restaurants".

On the other hand, for example, it is assumed that the user has requested to search a "pasta restaurant" by operating the information processing device 100, while driving outside the sphere of life AR2. In such a case, the service control unit 136 searches "pasta restaurants" present within a predetermined range corresponding to the current location of the user. Then, the service control unit 136 may control such that information on the "pasta restaurant" at a location closer to the current location of the user is preferentially provided, among the searched "pasta restaurants".

6. Processing Procedure

Figure 5:
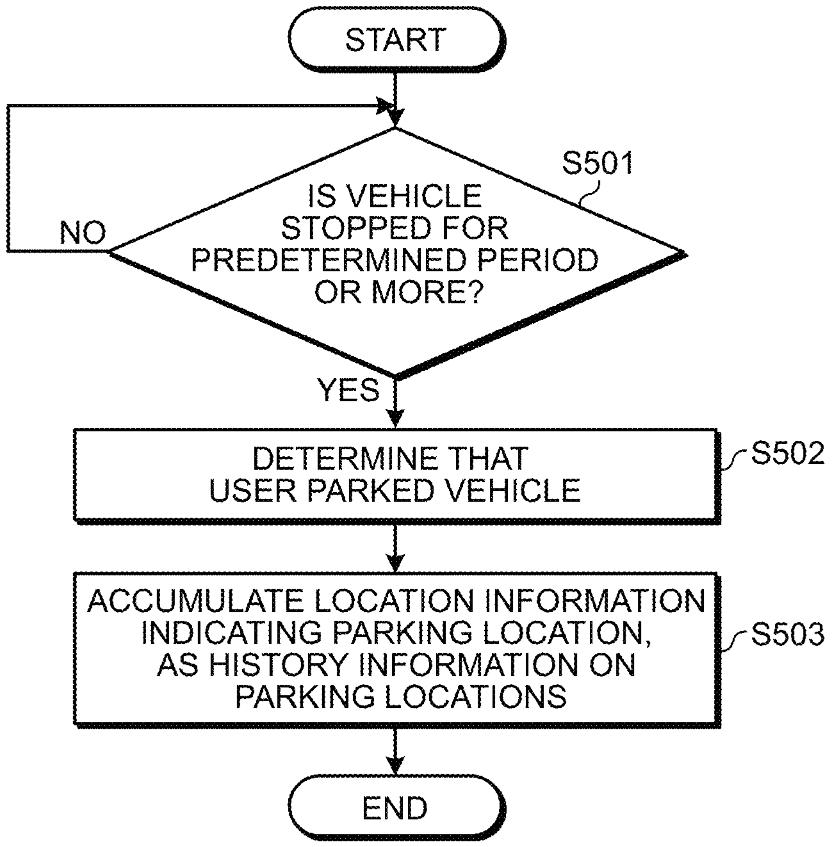
FIG. 5 is a flowchart illustrating a collection procedure for collecting history information.
Figure 6:
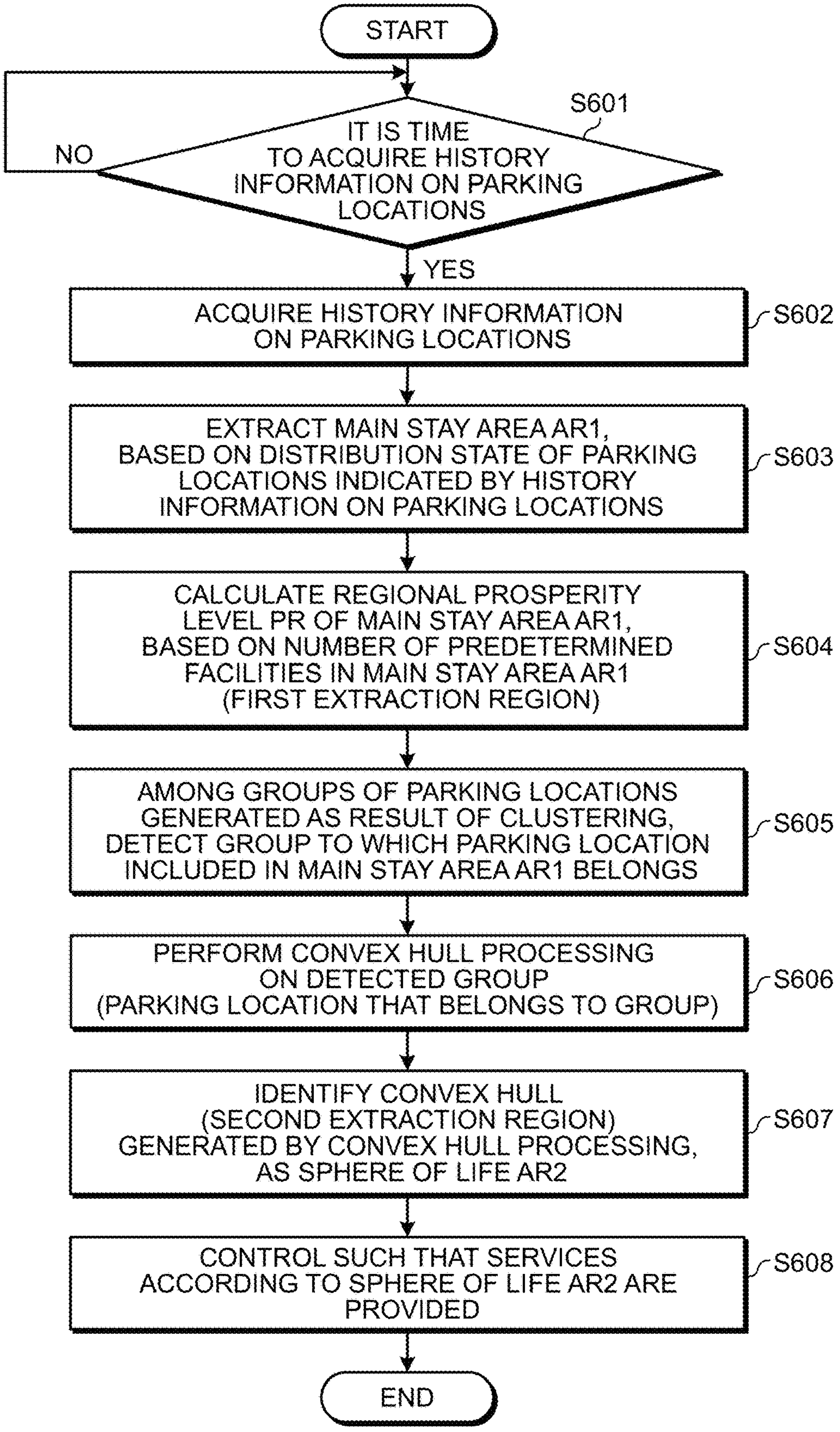
FIG. 6 is a flowchart illustrating an identification processing procedure for identifying the sphere of life.

Subsequently, with reference to FIG. 5 and FIG. 6, a procedure of information processing implemented by the information processing method according to the embodiment will be described. The information processing procedure according to the embodiment can be divided into a collection process for collecting history information on parking locations, and a sphere of life identification process using the collected history information. Therefore, the procedure of the collection process will be described in FIG. 5, and the procedure of the sphere of life identification process will be described in FIG. 6.

6-1. Processing Procedure (1)

First, with reference to FIG. 5, the procedure of information processing performed in the collection process for collecting history information will be described. FIG. 5 is a flowchart illustrating a collection procedure for collecting history information.

First, if the vehicle VEx is stopped, the detection unit 131 determines whether the vehicle VEx is stopped for a predetermined period or more, by measuring the vehicle stopping time (step S501). If it is determined that the vehicle stopping time is less than a predetermined period (in other words, if it is determined that the vehicle VEx started to move before a predetermined period has passed) (No at step S501), the detection unit 131 waits until it is determined that the vehicle VEx is stopped for a predetermined period or more.

On the other hand, if it is determined that the vehicle VEx is stopped for a predetermined period or more (Yes at step S501), the detection unit 131 determines that the user parked the vehicle VEx (step S502).

Next, upon detecting the location where the vehicle VEx is parked as the parking location, the detection unit 131 accumulates the location information indicating the parking location in the history information database 121, as the history information on parking locations (step S503).

6-2. Processing Procedure (2)

Next, with reference to FIG. 6, the procedure of information processing performed in the sphere of life identification process will be described. FIG. 6 is a flowchart illustrating an identification processing procedure for identifying the sphere of life.

First, the acquisition unit 132 determines whether it is time to acquire history information on parking locations (step S601). If it is not time to acquire history information on parking locations (No at step S601), the acquisition unit 132 waits until it is determined that it is time to acquire history information on parking locations.

On the other hand, if it is determined that it is time to acquire history information on parking locations (Yes at step S601), the acquisition unit 132 acquires the history information on parking locations (step S602). For example, the acquisition unit 132 acquires history information from the history information database 121.

Next, the calculation unit 133 extracts the main stay area AR1 on the basis of the distribution state of the parking locations indicated by the history information on parking locations (step S603). For example, the calculation unit 133 may extract an area with the highest density distribution of parking locations, among the areas obtained by dividing the map information indicating the distribution state, as the main stay area AR1.

Then, the calculation unit 133 calculates the regional prosperity level PR of the main stay area AR1, on the basis of the number of predetermined facilities in the main stay area AR1 (first extraction region) (step S604). For example, the calculation unit 133 may calculate the number of predetermined facilities per unit area in the main stay area AR1 as the regional prosperity level PR.

Next, the analysis unit 134 clusters (for example, perform DBSCAN clustering on) the parking locations indicated by the history information on parking locations, on the basis of the regional prosperity level PR, and among the groups of parking locations generated as a result of clustering, detects the group to which the parking location included in the main stay area AR1 belongs (step S605).

The identification unit 135 performs convex hull processing on the group detected at step S605 (step S606). As an example, the identification unit 135 may perform convex hull processing on the parking location that belongs to the detected group.

Moreover, as another example, the identification unit 135 may perform convex hull processing, using link information corresponding to the parking location that belongs to the detected group. For example, on the basis of the parking location that belongs to the detected group and the history of traveling position of the vehicle VEx, the identification unit 135 detects the road information according to the travel route of the vehicle VEx until the vehicle VEx reaches this parking location. For example, as the road information, the identification unit 135 detects link information indicating the link shape of the road according to the travel route of the vehicle VEx. The identification unit 135 may also use predetermined map information to detect link information. Then, the identification unit 135 performs convex hull processing on the detected road information (link shape). Moreover, the identification unit 135 may perform convex hull processing using information on the travel link and the number of traveling times.

Then, the identification unit 135 identifies the polygon area (second extraction region) that is a convex hull generated by convex hull processing, as the sphere of life AR2 (step S607).

Moreover, the service control unit 136 may control such that services according to the sphere of life AR2 are provided (step S608).

7. Modification

The information processing device 100 according to the embodiment described above may be implemented in various other forms in addition to the embodiment described above. Therefore, in the following, other embodiments of the information processing device 100 will be described.

For example, to identify the sphere of life, when the sphere of life identification logic is performed in a state where sufficient history information is not accumulated (for example, the initial state when the user has just started using the service SA), the information processing device 100 may extract a specific area corresponding to the user as the main stay area AR1. For example, if the user has registered a location where he/she frequently spends time (for example, location of home), the information processing device 100 may extract a circular area around this location as the main stay area AR1. As an example, the information processing device 100 can extract a circular area with a radius of average area of sphere of life, as the main stay area AR1.

For example, in the initial state where sufficient history information is not yet accumulated, there is a case the information processing device 100 cannot generate a cluster, when DBSCAN clustering is simply performed. This is because many parking locations are eliminated as noise by the DBSCAN clustering. However, in the initial state where sufficient history information is not yet accumulated, the information processing device 100 can properly identify the sphere of life AR2, even when history information is insufficient, by setting the main stay area AR1 using the method described above.

If it is determined that sufficient history information is accumulated, the information processing device 100 may eliminate the main stay area AR1 set in the initial state, and perform DBSCAN clustering using appropriate parameters. Then, the information processing device 100 may identify the sphere of life AR2 by performing convex hull processing on the parking locations considered as a cluster, and surrounding the parking locations by the convex hull.

Moreover, as a result of DBSCAN clustering, multiple clusters may be generated. In such a case, for example, the information processing device 100 may identify a plurality of sphere of lives AR2 such as a first sphere of life AR2, second sphere of life AR2, third sphere of life AR2, . . . , and nth sphere of life AR2, in order from the cluster including the larger number of parking locations.

By identifying the multiple sphere of lives AR2 according to the number of parking locations in this manner, the information processing device 100 can change the evaluation of each sphere of life AR2. For example, the information processing device 100 may change evaluation (importance) between the first sphere of life AR2 (for example, an area around the home) with the largest number of parking locations, and the second sphere of life AR2 (for example, an area around the workplace) with the next largest number of parking locations.

Moreover, the information processing device 100 may control such that services according to evaluation are provided, by changing the evaluation as described above. For example, if the user is located in the first sphere of life AR2, the information processing device 100 may control such that a reminder based on the schedule is notified. By receiving such notification when the user is in the first sphere of life AR2 that is the area around the home, the user can use his/her local knowledge to make a recovery, even if there is something he/she has forgotten to do.

On the other hand, if the user is located in the second sphere of life AR2, the information processing device 100 may not notify a reminder or may reduce the number of times the reminder is notified.

8. Limited Release

In the embodiment described above, the information processing device 100 obtains the main stay area AR1 and the regional prosperity level PR, on the basis of history information on parking locations where the user parked the vehicle VEx, and identifies the sphere of life AR2 by the clustering processing and convex hull processing using the information.

However, the information processing device 100 may also obtain the main stay area AR1 and the regional prosperity level PR, by further using history information on parking locations where the user parked the vehicle VEx on roads other than public roads (off-roads), and identify the sphere of life AR2 using the information.

Moreover, the information processing device 100 may also obtain the main stay area AR1 and the regional prosperity level PR, by further using history information on locations where it is assumed that the user temporarily stopped the vehicle VEx (for example, locations where the speed of the vehicle VEx became zero), and identify the sphere of life AR2 using the information.

9. Hardware Configuration

Figure 7:
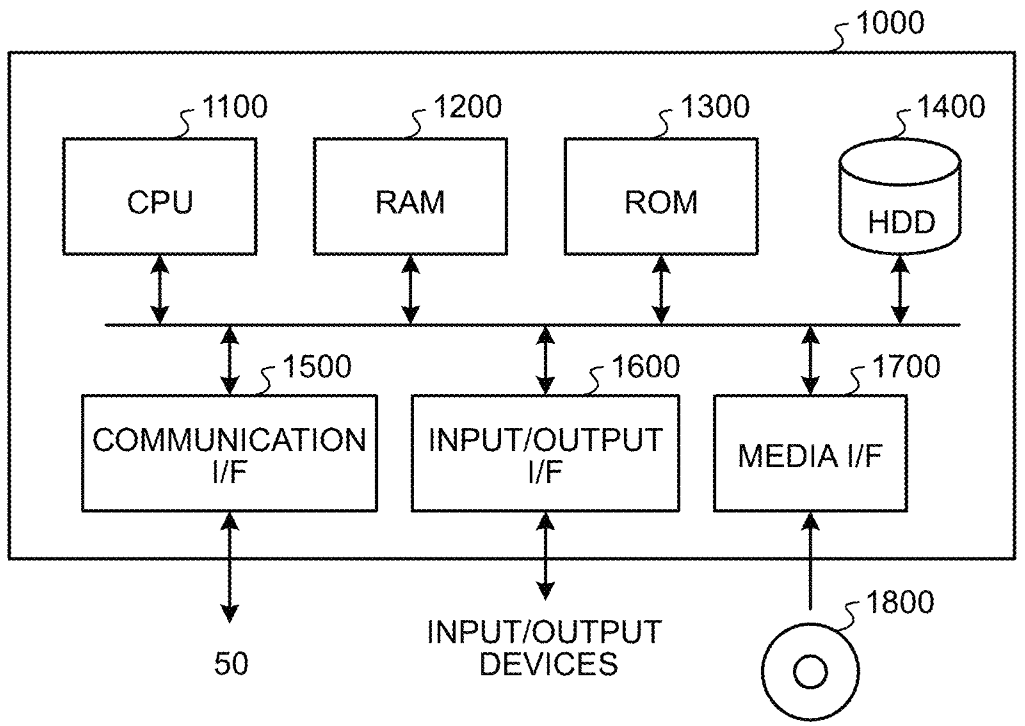
FIG. 7 is a hardware configuration diagram illustrating an example of a computer that implements the functions of an information processing device 100.

Moreover, for example, the information processing device 100 according to the embodiment described above is implemented by a computer 1000 with a configuration as illustrated in FIG. 7. FIG. 7 is a hardware configuration diagram illustrating an example of a computer that implements the functions of the information processing device 100. The computer 1000 includes a CPU 1100, a RAM 1200, a ROM 1300, an HDD 1400, a communication interface (I/F) 1500, an input/output interface (I/F) 1600, and a media interface (I/F) 1700.

The CPU 1100 operates on the basis of a computer program stored in the ROM 1300 or HDD 1400, and controls each unit. The ROM 1300 stores a boot program executed by the CPU 1100 when the computer 1000 is started, a computer program depending on the hardware of the computer 1000, and the like.

The HDD 1400 stores the computer program executed by the CPU 1100, data used by such a computer program, and the like. The communication interface 1500 receives data from other devices via a predetermined communication network, sends the received data to the CPU 1100, and transmits the data generated by the CPU 1100 to other devices via a predetermined communication network.

The CPU 1100 controls an output device such as a display and a printer, and an input device such as a keyboard and a mouse via the input/output interface 1600. The CPU 1100 acquires data from the input device via the input/output interface 1600. Moreover, the CPU 1100 outputs the generated data to the output device via the input/output interface 1600.

The media interface 1700 reads a computer program or data stored in a recording medium 1800, and provides the read computer program or data to the CPU 1100 via the RAM 1200. The CPU 1100 loads such a computer program from the recording medium 1800 onto the RAM 1200 via the media interface 1700, and executes the loaded computer program. For example, the recording medium 1800 is an optical recording medium such as a Digital Versatile Disc (DVD) or a Phase change rewritable Disk (PD), magneto-optical recording medium such as a Magneto-Optical disk (MO), tape medium, magnetic recording medium, or a semiconductor memory.

For example, when the computer 1000 functions as the information processing device 100 according to the embodiment, the CPU 1100 of the computer 1000 implements the functions of the control unit 130, by executing the computer program loaded on the RAM 1200. The CPU 1100 of the computer 1000 reads and executes these computer programs from the recording medium 1800. However, as another example, these computer programs may be obtained from another device via a predetermined communication network.

10. Others

Moreover, among the processes described in each of the embodiments described above, all or part of the processes described as being performed automatically can be performed manually, or all or part of the processes described as being performed manually can be performed automatically by a known method. In addition, the processing procedures, specific names, and information including various data and parameters illustrated in the specification described above or in the drawings may be optionally changed, unless otherwise specified. For example, various information illustrated in each drawing is not limited to the illustrated information.

Moreover, each component of each device illustrated in the drawings is functionally conceptual, and need not necessarily be physically configured as illustrated. That is, the specific mode of dispersion and integration of each device is not limited to the ones illustrated in the drawings, and all or a part thereof can be functionally or physically dispersed or integrated in an optional unit according to various kinds of load and the status of use.

Furthermore, each of the embodiments described above may be appropriately combined within a range in which the processing contents do not contradict with each other.

While some of the embodiments of the present application have been described in detail with reference to the drawings, these are merely examples, and the present invention can be implemented in other forms subjected to various modifications and improvements based on the knowledge of those skilled in the art, including the aspects described in the disclosure of the invention.

REFERENCE SIGNS LIST

1 information processing system
30 external device
100 information processing device
120 storage unit
121 history information database
122 sphere of life information database
130 control unit
131 detection unit
132 acquisition unit
133 calculation unit
134 analysis unit
135 identification unit
136 service control unit

The invention claimed is:

1. An information processing device, comprising a controller comprising a processor or circuit configured to:
- acquire history information on one or more parking locations where a user parked a vehicle;
- calculate, as a regional prosperity level, a predetermined parameter indicating service fulfillment in a first extraction region that is a main area where the user mainly spends time in daily life and is extracted according to a distribution state of the one or more parking locations;
- generate one or more groups of parking locations by clustering the one or more parking locations based on each parking location included in the history information and the regional prosperity level; and
- identify, as a second extraction region that is a sphere of life of the user, a region formed based on a group, among the one or more groups, to which a parking location included in the first extraction region belongs.

2. The information processing device according to claim 1, wherein the processor or circuit is further configured to calculate the predetermined parameter per unit area in the first extraction region as the regional prosperity level.

3. The information processing device according to claim 1, wherein the predetermined parameter is a number of predetermined facilities in the first extraction region, a number of public transport services in the first extraction region, or feature information indicating a geographical feature of the first extraction region.

4. The information processing device according to claim 1, wherein the processor or circuit is further configured to:
- perform clustering on the parking location indicated by the history information, based on the regional prosperity level;
- control the first extraction region by performing convex hull processing on the group to which the parking location included in the first extraction region belongs, among the one or more groups of the parking location generated as a result of clustering and;
- identify the second extraction region that is an area after being controlled, as the sphere of life of the user.

5. The information processing device according to claim 4, wherein the processor or circuit is further configured to adjust the predetermined parameter used for clustering with the regional prosperity level when performing clustering on the parking location.

6. The information processing device according to claim 1, wherein the processor or circuit is further configured to control a service to be provided to the user, according to the second extraction region.

7. The information processing device according to claim 6, wherein the processor or circuit is further configured to control such that an advertising content related to a predetermined facility in the second extraction region is provided to the user.

8. The information processing device according to claim 7, wherein the processor or circuit is further configured to control a route provided as route guidance to a destination point set by the user, according to whether the destination point is in the second extraction region.

9. The information processing device according to claim 7, wherein the processor or circuit is further configured to control such that notification is made according to whether a predetermined danger area is included in the second extraction region, to a notification control system that notifies presence of the predetermined danger area in advance in route guidance.

10. The information processing device according to claim 7, wherein the processor or circuit is further configured to control, when a search request is made by the user, a search result corresponding to the search request, according to whether a location where the search request is made is in the sphere of life.

11. The information processing device according to claim 6, wherein the processor or circuit is further configured to control such that route guidance according to a destination point set by the user and the second extraction region is provided.

12. The information processing device according to claim 1, wherein the processor or circuit is further configured to calculate, as the regional prosperity level, the predetermined parameter indicating the service fulfillment of a service for local residents living in the first extraction region.

13. An information processing method performed by an information processing device, the information processing method comprising:
- acquiring history information on one or more parking locations where a user parked a vehicle;
- calculating, as a regional prosperity level, a predetermined parameter indicating service fulfillment in a first extraction region that is a main area where the user mainly spends time in daily life and is extracted according to a distribution state of the one or more parking locations;
- generating one or more groups of parking locations by clustering the one or more parking locations based on each parking location included in the history information and the regional prosperity level; and
- identifying, as a second extraction region that is a sphere of life of the user, a region formed based on a group, among the one or more groups, to which a parking location included in the first extraction region belong.

14. A non-transitory computer-readable storage medium storing an information processing program that causes a computer to execute a process including:

acquiring history information on one or more parking locations where a user parked a vehicle;

calculating, as a regional prosperity level, a predetermined parameter indicating service fulfillment in a first extraction region that is a main area where the user mainly spends time in daily life and is extracted according to a distribution state of the one or more parking locations;

generating one or more groups of parking locations by clustering the one or more parking locations based on each parking location included in the history information and the regional prosperity level; and identifying, as a second extraction region that is a sphere of life of the user, a region formed based on a group, among the one or more groups, to which a parking location included in the first extraction region belong.

* * * * *